Jan. 1, 1952     G. H. SCHAUWEKER     2,580,605
EYE PROTECTIVE DEVICE
Filed Nov. 14, 1949
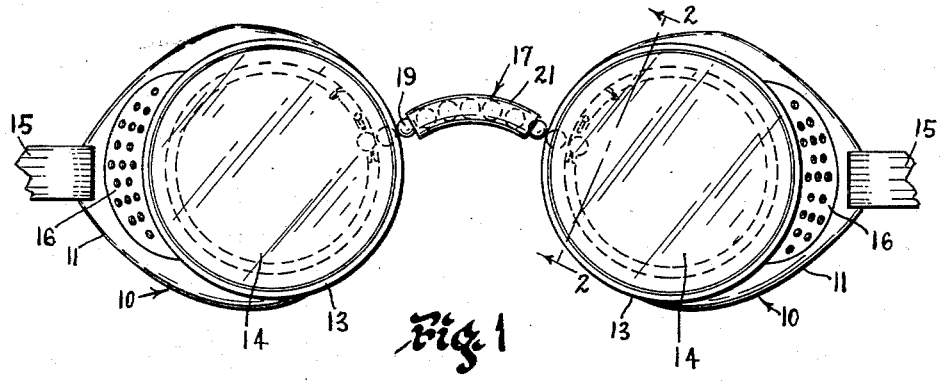
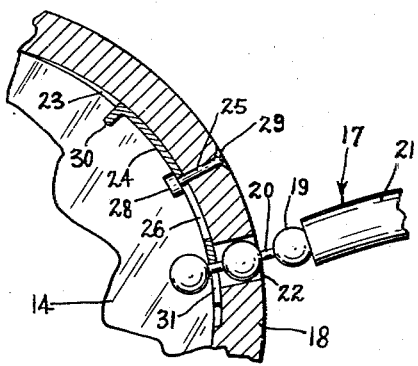
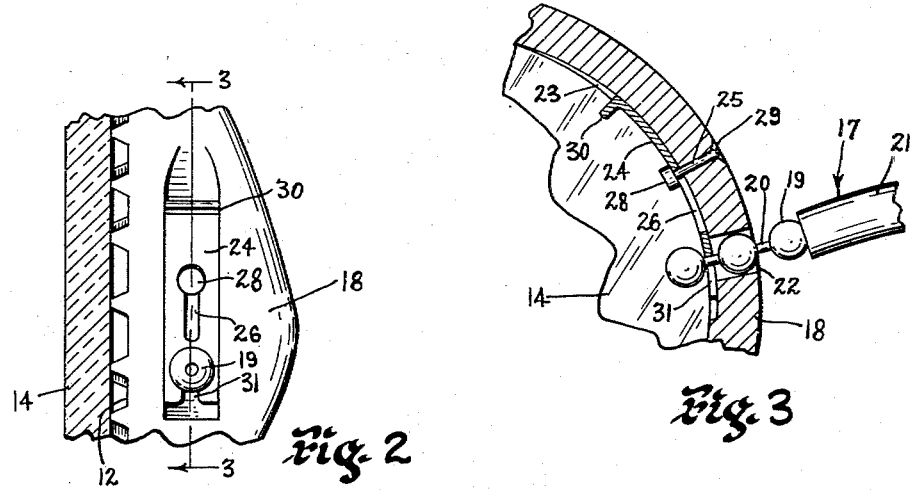
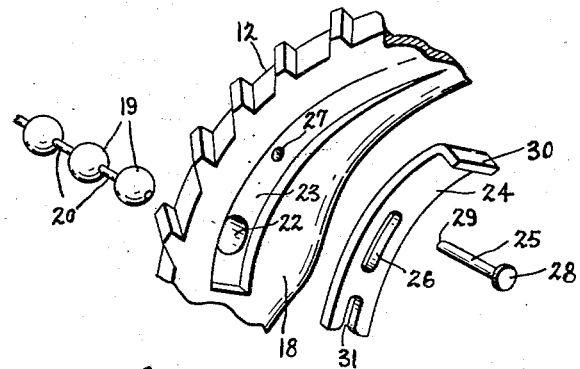
INVENTOR
GEORGE H. SCHAUWEKER
BY
Louis L. Gagnon
ATTORNEY Patented Jan. 1, 1952

2,580,605

UNITED STATES PATENT OFFICE 2,580,605

EYE PROTECTIVE DEVICE

George H. Schauweker, Southbridge, Mass., assignor to American Optical Company, Southbridge, Mass., a voluntary association of Massachusetts Application November 14, 1949, Serial No. 127,086

3 Claims. (Cl. 2—14)

This invention relates to eye protective devices and has particular reference to improved means for connecting the bridge members to the lens holding members of such devices.

The principal object of this invention is to provide an improved bridge connection for uniting the lens holding members of eye protective goggles wherein the said parts may be adjusted or interchanged without requiring the removal of the lenses.

Another object is to provide novel connection means for attaching a ball-link type flexible bridge to the lens holding members of eye protective goggles embodying a latch adjustably supported in a slideway formed internally of the respective lens holding members in a direction substantially parallel with the lens supporting edge of said holding members and having a slotted portion adapted to straddle the links intermediate the spaced balls of the flexible bridge which are extended through an opening in the side wall of the lens holding members and which opening communicates with the respective slideways.

Another object is to provide a securing device of the above character which is simple in construction, efficient in operation and economical to manufacture.

Other objects and advantages of the invention will become apparent from the following description taken in connection with the accompanying drawing, in which:

Fig. 1 is a front elevational view of an eye protective device embodying the invention;

Fig. 2 is a fragmentary sectional view taken on line 2—2 of Fig. 1 and looking in the direction of the arrows;

Fig. 3 is a fragmentary sectional view taken on line 3—3 of Fig. 2 and looking in the direction of the arrows; and Fig. 4 is an exploded view showing the parts comprising the securing means.

In the manufacture of eye protective devices, particularly of the goggle type, it is important that means be provided whereby the distance between the lens holding members forming part of the device may be adjusted so that the completed device can be made to fit the facial requirements of different individuals. In providing eye protective devices with adjustable bridge members for this purpose it has been found that, in order to make the desired adjustments, it is generally necessary to remove the lenses. Such devices, therefore, require an undue length of time to accomplish the adjustment, with the additional objection that the lenses, upon being removed, may easily become broken or misplaced.

In overcoming these objections, the present invention embodies novel connection means for securing each end of a flexible bridge member to a respective lens holding member, which connection means are so constructed that the distance between the lens holding members may be quickly and easily adjusted without necessitating the removal of the lenses from the lens holding members.

Referring more particularly to the drawing wherein like characters of reference designate like parts throughout the several views, Fig. 1 illustrates an eye protective device embodying the invention and comprising a pair of spaced lens holding members or eyecups 10 each of which are formed with a face engaging rear edge 11 shaped to the general contour of the face and a ringlike frontal portion 12 having threads formed on its exterior surface to which a threaded lens retaining ring 13 is attached to secure a protective lens 14 within the eyecup.

The eyecups 10 have a suitable headband 15 secured thereto in a conventional manner to hold the device on the face of the wearer, and a perforated shield 16 is secured over an opening in the outer side of each eyecup 10 to provide the necessary ventilation.

The eyecups 10 are connected centrally by a bridge member 17 which, in accordance with this invention, comprises an elongated ball-link device which is connected adjacent each end to the nasal portion 18 of a respective eyecup 10. The ball-link bridge member 17 is formed with a plurality of spaced balls 19 (Fig. 4) connected by a series of links 20 to form a flexible member which may be provided with a curved tubular member 21 of stiff material or metal (Fig. 1) having a covering of rubber, heat resistant plastic, or other soft, resilient, protective material so that the device may be comfortably supported upon the nose of the wearer.

The connections of the ends of the bridge member 17 to the eyecups 10 are formed by piercing the nasal walls of the eyecups to form an opening 22 therethrough in which the ends of the bridge member 17 can be positioned. The inner surface of the nasal wall 18 of each eyecup is provided with a shallow groove 23 extending substantially in the direction of the adjacent edge of the lens 14 and a latch 24 is positioned within the groove 23 and adapted to slide longitudinally thereof.

A headed pin 25 extends through a slotted opening 26 in the latch 24 and is positioned in an opening 27 (Fig. 4) provided therefor in the side wall of the eyecup with its head portion 28 disposed against the outer surface of the latch adjacent the slotted opening 26 and its opposed end portion 29 fixedly secured in the opening 27 by expansion thereof or other suitable means. Because of the fact that the pin 25 extends through the slotted opening 26 and is immovably secured to the nasal side wall 18 of the eyecup the latch 24 can be made to slide within the groove only to the extent permitted by the slotted opening 26. One end of the latch 24, preferably the end thereof directed toward the top of the eyecup, is turned to form a lip or thumb-piece 30 whereby the latch may be easily gripped and moved as desired. The opposed end of the latch 24 is provided with an open ended slot 31 which is adapted, when the latch is slid downwardly, to straddle a link portion 20 of the bridge member 17 substantially as shown in Figs. 2 and 3. Since the width of the groove 31 is substantially less than the diameter of the balls 19 forming a part of the bridge 17 the bridge will therefore be securely attached to the eyecup.

When it is desired to interchange or adjust a bridge member 17, the latch member 24 is moved upwardly to permit the groove 31 to because disengaged from the adjacent link 20. This permits the end of the bridge member 17 to be adjusted inwardly or outwardly of the opening 22 in the eyecup whereupon the latch 24 can be again slid downwardly in the groove 23 to straddle another link 20 and thus securely connect the bridge member to the eyecup.

In the manufacture of eye protective devices embodying this invention it is to be understood that if desired one end of the bridge member 17 can be permanently attached to an eyecup while the opposed eyecup can be provided with the adjustable connection described herein.

It is also to be understood that a chain type bridge member 17 can be satisfactorily substituted for the ball-link type of bridge arrangement referred to above. In this instance, the slot 31 in the latch 24 will straddle one of the chain links adjacent the end of the bridge and the adjacent chain links will engage with the opposed front and rear surfaces of the latch 24 to securely retain the bridge in position.

From the foregoing, it will be seen that there has been provided novel means of simple and efficient nature for carrying out the objects of the invention, particularly in providing extremely simple and efficient means for allowing the bridge member to be easily and quickly adjusted and for locking it in adjusted position without requiring the removal of the lenses. Although the novel features of the invention have been shown and described and are pointed out in the annexed claims, it will be understood that many changes may be made in the construction and arrangement of parts shown and described without departing from the spirit of the invention as expressed in the accompanying claims. Therefore, it is to be understood that all matter set forth or shown is to be interpreted as illustrative and not in a limiting sense.

I claim:

1. In a device of the character described, an eyecup having a longitudinal groove formed on the inner surface of its nasal side and further having an opening communicating with said groove, the depth of said groove becoming progressively shallower in a direction extending away from said opening, a bridge having an end portion formed of successive large and small cross sectional portions extending through said opening and a latch member seated in said groove, said latch member having a portion adjacent one end to straddle one of said small cross sectional portions of the bridge and having a longitudinally disposed slot intermediate its opposed end and said straddling portion, and a pin extending through said slot and connected to the sidewall of the eyecup at a point intermediate said opening and an end of the groove, said pin having an enlarged head disposed against the outer surface of the latch member whereby the inner surface of the latch member is caused to frictionally engage the base of the groove, and said latch member being slidable within the limits of the extent of the longitudinally disposed slot therein to permit the straddling portion thereof to be moved out of its straddling connection with the portion of small cross section of the bridge as when sufficient pressure is urged against the latch member to overcome the above mentioned frictional engagement of the inner surface of the latch member with the base of the groove.

2. In a device of the character described, an eyecup having a longitudinal groove formed on the inner surface of its nasal side extending in a direction substantially parallel to the adjacent front of the eyecup so as to have a generally arcuate longitudinal shape, and further having an opening communicating with said groove adjacent the lower end thereof, a bridge having an end portion formed of successive large and small cross sectional portions extending through said opening and a latch member seated in said groove, said latch member having a portion adjacent its lower end to straddle one of said small cross sectional portions of the bridge and having a longitudinally disposed slot intermediate its opposed end and said straddling portion, and a pin extending through said slot and connected to the sidewall of the eyecup at a point intermediate said opening and the upper end of the groove, said pin having an enlarged head disposed against the outer surface of the latch member whereby the inner surface of the latch member is caused to frictionally engage the base of the groove, and said latch member being slidable within the limits of the extent of the longitudinally disposed slot therein to permit the straddling portion thereof to be moved out of its straddling connection with the portion of small cross section of the bridge as when sufficient pressure is urged against the latch to overcome the above mentioned frictional engagement of the inner surface of the latch member with the base of the groove.

3. An eye protection device of the character described comprising a pair of eyecups each having a longitudinal groove formed on the inner surface of its nasal side extending in a direction substantially parallel to the adjacent front of the eyecups so as to have a generally arcuate longitudinal shape and further having an opening communicating with said groove adjacent the lower end thereof, the depth of said groove becoming progressively shallower in a direction extending upwardly from said opening, a bridge having an end portion formed of successive large and small cross sectional portions extending through said opening and a latch member seated in said groove, said latch member having a bifurcated lower end portion to straddle one of said small cross sectional portions of the bridge and having a longitudinally disposed slot intermediate its opposed end and said bifurcated end portion, and a pin extending through said slot and connected to the sidewall of the eyecup at a point intermediate said opening and the upper end of the groove, said pin having an enlarged head disposed against the outer surface of the latch member whereby the inner surface of the latch member is caused to frictionally engage the base of the groove, and said latch member being slidable within the limits of the extent of the longitudinally disposed slot therein to permit the bifurcated end portion thereof to be moved out of its straddling connection with the portion of small cross section of the bridge as when sufficient pressure is urged against the latch to overcome the above mentioned frictional engagement of the inner surface of the latch member with the base of the groove.

GEORGE H. SCHAUWEKER.

REFERENCES CITED

The following references are of record in the file of this patent:

UNITED STATES PATENTS

| Number | Name | Date |
|---|---|---|
| 2,194,401 | Malcom | Mar. 19, 1940 |
| 2,195,175 | Kimball | Mar. 26, 1940 |